March 29, 1960 R. S. HAHN 2,930,167
GRINDING MACHINE
Filed Feb. 24, 1958 2 Sheets-Sheet 2

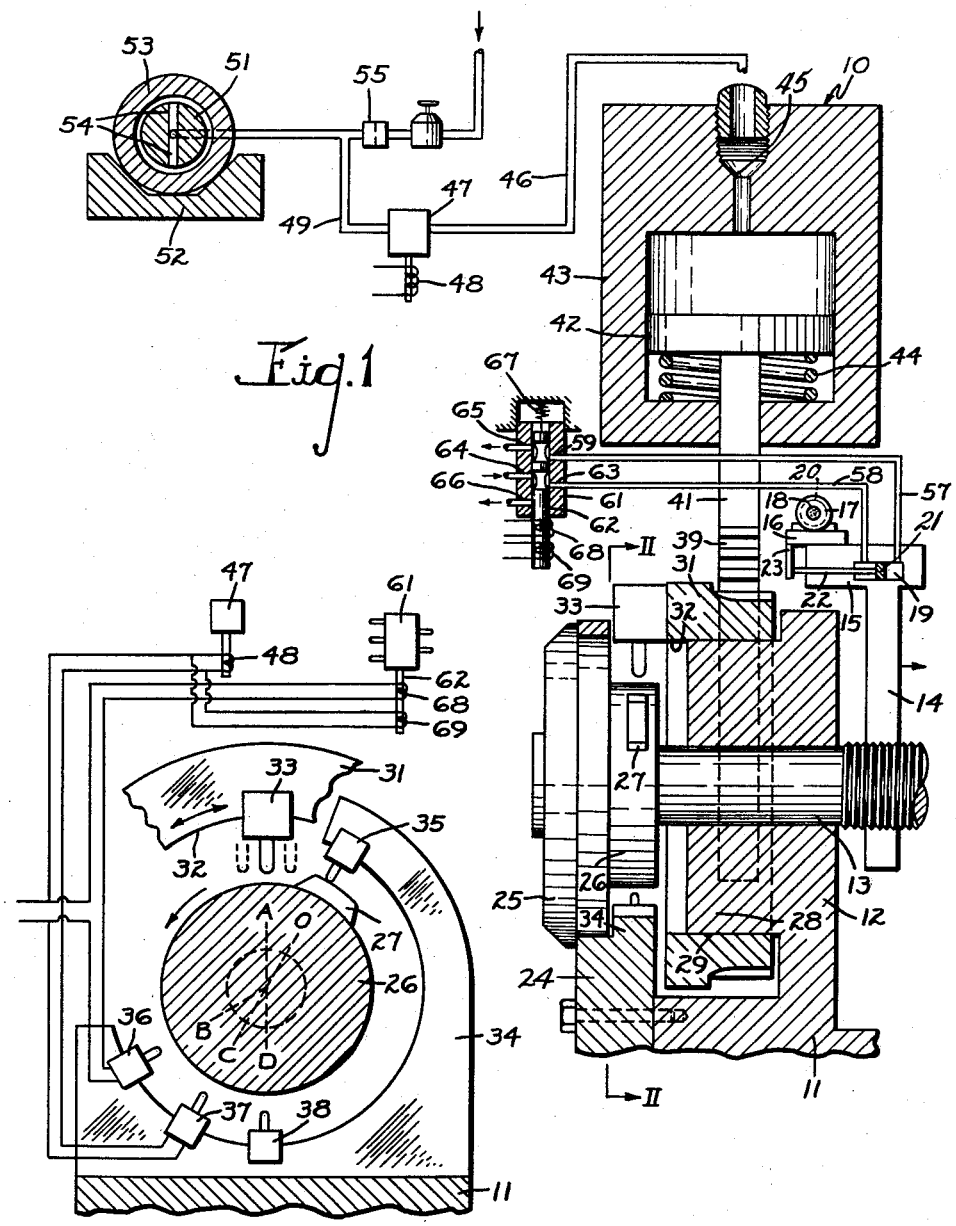

| | 35 O | 33 A | 36 B | 37 C | 38 D | 35 O |
|---|---|---|---|---|---|---|
| FEED | | RAPID IN-FEED | ROUGH GRIND | BACK-OFF | FINISH GRIND | NO FEED (LOADING) |
| VALVE 47 | | CLOSED | CLOSED | CLOSED | OPEN | CLOSED |
| SPINDLE DEFLECTION | | ZERO TO SUBSTANTIAL | SUBSTANTIAL AT PRESET CONSTANT VALUE | SUBSTANTIAL TO SMALL | SMALL | ZERO |
| POSITION OF BACK-OFF PISTON | | RIGHT | RIGHT | LEFT | LEFT | RIGHT |

Fig. 3

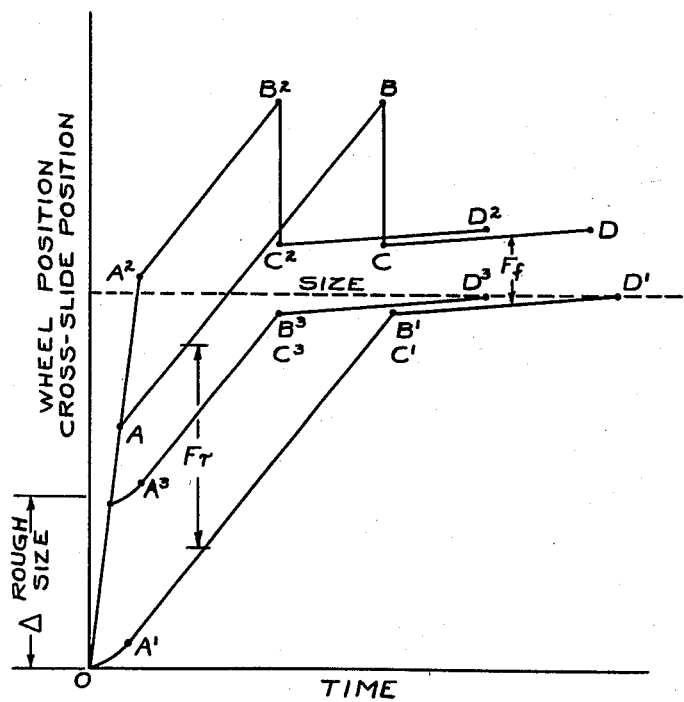

Fig. 4

INVENTOR.
Robert S. Hahn
BY
Norman S. Blodgett
Attorney

United States Patent Office 2,930,167
Patented Mar. 29, 1960

2,930,167

GRINDING MACHINE

Robert S. Hahn, Northboro, Mass., assignor to Heald Machine Company, Worcester, Mass., a corporation of Delaware Application February 24, 1958, Serial No. 716,937

10 Claims. (Cl. 51—165)

This invention relates to a grinding machine and more particularly to apparatus for generating a surface of revolution to a high degree of accuracy.

In the grinding of surfaces of revolution, it is difficult to grind the finished surface to an accurate size when the apparatus used is the so-called "feed-rate" machine, when the finished size is determined by the position of the wheelhead relative to the workhead. The principal reason why such a means of sizing gives poor results is that differences in rough size of the workpieces produce different grinding forces between the wheel and workpiece and, therefore, different grinding rates and finished sizes. This is particularly true in the grinding of internal bores and the like. The variations in rough size of workpieces presented to a feed-rate grinding machine also cause uncontrollable variations in taper, resulting from the variations in wheel spindle deflection. Some of these problems were solved by the apparatus shown in the patent of Hahn No. 2,647,348 in which the grinding force is used to control the feed rate to keep the grinding force constant; the grinding force is measured by means of strain gages mounted in a wheelhead which is pivoted to compensate for wheel spindle deflection. Another solution to these problems is shown in the patent to Hahn No. 2,680,941 wherein the grinding force is limited to a predetermined value, thus permitting rapid in-feed, and the grinding force is maintained at a constant value; the feed rate is, of course, indeterminant and the wheelhead is pivoted to prevent taper due to wheel spindle deflection. Neither of these machines is of the common type in which the grinding cycle is controlled by use of several levels of feed rate, but the feed rate is constant during any one part of the cycle. The problems thus presented have been obviated by the present invention in a novel manner.

It is, therefore, an outstanding object of the present invention to provide a feed-rate grinding machine which is independent of random stock variations.

Another object of the invention is the provision of a grinding machine which uses a pregaging of the workpiece to control the grinding cycle.

It is a still further object of this invention to provide a feed-rate grinding machine having means for gaging the surface of the workpiece before the grinding operation and using the measurement thus obtained to control a rapid in-feed, a constant-force rough grinding operation, and a back-off before finishing.

A further object of the instant invention is the provision of a grinding machine in which a pre-gaging measurement is used with a fixed feed and a constant, high-value grinding force to obtain accurately-sized finished workpieces despite variations in the sizes of rough workpieces.

With these and other objects in view, as will be apparent to those skilled in the art, the invention resides in the specification and covered by the claims appended hereto.

The character of the invention, however, may be best understood by reference to certain of its structural forms, as illustrated by the accompanying drawings in which:

Figure 1 is a generally schematic view of a grinding machine embodying the principles of the present invention, Figure 2 is a sectional view of the invention taken on line II—II of Figure 1, with certain elements shown schematically, Figure 3 is a chart showing the condition of some of the elements during the grinding cycle, and Figure 4 is a graphical showing of the relative positions of certain elements during the grinding cycle.

Referring first to Figures 1 and 2, wherein are best shown the general features of the invention, the grinding machine, indicated generally by the reference numeral 10, is shown as being of the internal type and comprising a base 11 having a vertical wall 12 in which is rotatably mounted a horizontal, threaded shaft 13. The threaded shaft forms part of the usual feed mechanism of a grinding machine, not shown, a suitable feed mechanism being shown in detail in the patent of Kuniholm et al. No. 2,612,008. The threaded shaft 13 engages a dependent finger 14 which extends downwardly from a table 15 which is slidably mounted on the base. A secondary table 16 is slidably mounted on the table 15 and, in turn, carries a motorized wheelhead 17 from which extends an abrasive wheel 18. It will be understood that a workhead 20, including conventional means for supporting and rotating a workpiece having a bore to be finished, is mounted on the base 11. Furthermore, the table 15 is mounted on the base for movement under the action of the threaded shaft 13 transversely of the axis of the workpiece and the wheel 18 in the usual manner; the secondary table 16 is movable relative to the table 15 in the transverse direction also. A cylinder 19 is associated with the table 15 and is provided with a piston 21 whose piston rod 22 is attached at the outer end to a finger 23 extending downwardly from the table 16.

Mounted on the front of the base 11 is a plate 24 in which is rotatably mounted an indicator disc 25 of the feed mechanism. Mounted on the threaded shaft 13 for rotation therewith is a cylindrical control drum 26 having a cam 27 extending radially therefrom. The vertical wall 12 is provided with a hub 28 which extends toward the control disc 26 and has an outer cylindrical surface 29 extending coaxially of the shaft. Surrounding the hub 28 is a pinion gear 31 having a bore 32 which engages the cylindrical surface 29 in rotatable relationship. Fastened to the gear 31 is a microswitch 33 positioned so that its actuating finger lies in the path of the cam 27 when the control drum 26 is rotated. A portion 34 of the plate 24 extends upwardly and around the control drum; on this portion are mounted microswitches 35, 36, 37, and 38, their radial positioning being such that their actuating fingers lie in the path of the cam 27. The angular positioning of the microswitches about the control drum will be described more fully hereinafter.

A rack 39 is formed on the piston rod 41 of a piston 42 which is slidably enclosed in a cylinder 43. The cylinder is fixed relative to the base 11 and a coil spring 44 biases the piston toward the end of the cylinder opposite the end from which the piston rod extends. The cylinder and piston are positioned so that the rack 39 engages the gear 31. A port 45 extends from the end of the cylinder toward which the piston is urged by the spring and threadedly attached to this port is one end of a conduit 46. The other end of the conduit is connected to one side of a valve 47 which is of the two-way type and which is solenoid operated to either an "open" position by energization of a coil 48 forming part of the solenoid.

Connected to the other side of the valve 47 is a conduit 49 connected at its other end to a plug gage 51. A supporting platen 52 is provided to support a workpiece 53 while the plug 51 is inserted therein to gage the bore. The gage and platen are preferably associated with the loading chute, not shown, by which the workpieces are successively introduced into the grinding machine. The gage 51 is provided with passages 54 leading to its outer surface so as to lie in opposition to various parts of the surface of the bore; the diameter of the gage is considerably less than that of any bore that may be encountered and a passage is thus formed between the plug and the surface of the bore. The intermediate portion of the conduit 49 is connected through an orifice 55 and a pressure regulating valve 56 to a source of air under pressure, not shown.

The cylinder 19 in the table 15 has connected to one end a conduit 57 and to the other end a conduit 58. The other end of the conduit 57 is connected to a port 59 of a four-way valve 61 having a plunger 62; the conduit 58 is similarly connected to a port 63 of the valve. The valve is also provided with an input port 64 which is connected to a source of hydraulic pressure, not shown, and to exhaust ports 65 and 66 which are connected to the sump, not shown, of the hydraulic system of the machine. The plunger 62 is configured in the usual manner so that in one position the conduit 57 is connected to exhaust and the conduit 58 is connected to pressure, while in a second position the situation is reversed. A spring 67 maintains the plunger normally in the first position, with pressure hydraulic fluid on the left side of the piston 21, so that the piston resides at the right end of the cylinder 19. The valve 61 is solenoid-actuated by coils 68 and 69, the plunger 62 residing in the said second position when either coil is energized.

The microswitches 33, 35, 36, 37, and 38 are all connected into the feed mechanism of the machine in the usual way and, since the manner of connection and control is old in the art, a specific description is omitted. However, the closing of the microswitch 35 causes the loading operation to terminate and the rapid in-feed to begin; the closing of the microswitch 33 terminates the in-feed and begins the rough grind feed; the closing of the microswitch 36 terminates the rough grind feed; the closing of microswitch 37 begins the finish grind feed; and the closing of the microswitch 38 brings about the termination of the finish grind feed, the retraction of the wheel from the workpiece and the beginning of the loading operation. These switches have other less usual functions, as will be shown. The microswitch 36 also serves to connect a source of electrical power to the coil 68 associated with the valve 61. The microswitch 37 also serves to connect the source of electrical power to the coil 69 associated with the valve 61 and to the coil 48 associated with the valve 47.

The operation of the invention will now be readily understood in view of the above description. Basically, the grinding machine of the invention operates in a manner similar to all "feed-rate" grinding machines. The rotation of the threaded shaft 13 causes the table 15 to move across the base 11 and cause the wheel 18 to move transversely of the axis of the workpiece. It will be understood that one workpiece is in operative position to be ground by the wheel 18 and the next workpiece is in the loading chute to be operated on by the platen 52 and the gage 51. The rotation of the threaded shaft 13 causes a similar rotation of the cam drum 26. As the drum rotates, the cam 27 engages and closes the microswitches one after another, producing certain changes in the cycle. The points in the grinding cycle at which the microswitches 35, 33, 36, 37 and 38 are closed by the cam are identified as points 0, A, B, C, and D, respectively, in Figure 2 and in the chart in Figure 3. While one workpiece is being ground, the next workpiece is in the loading chute in engagement with the platen 52. The gage 51 enters the workpiece bore and air passes through the passages 54 and through the space between the gage and the surface of the bore. Differences in sizes of the bores of successive workpieces cause differences in the ease with which air escapes, thus bringing about differences in back-pressure in the pneumatic system. When the valve 47 is open, the pressure thus obtained is transmitted through the conduit 46 to the cylinder 43. The piston 42 is positioned within the cylinder according to the amount of pressure and the piston acts through the rack 39 and the gear 31 to position the microswitch 33 relative to the other microswitches grouped about the periphery of the cam drum. This, of course, positions the point A in the cycle. If, for instance, the bore in the workpiece is larger than that of the workpiece preceding it, the back-pressure will be less and the piston will rise, causing the microswitch 33 to move clockwise (in Figure 2) and the position of the slide at the point when the rough grind begins will be suitably displaced, as is evident in Figure 4. The length of time occupied by the rapid in-feed will be longer and that of the rough grind will be shortened.

Referring now particularly to Figure 3, at the beginning of a cycle the microswitch 35 is closed at the point 0 which causes the wheel to traverse rapidly toward the surface of the workpiece at a high rate of speed; during this rapid in-feed there is no contact between the wheel and the work and this feed rate may be as high as is desirable without exceeding any grinding force limitations. The cam 27 soon reaches the microswitch 33 which has previously been positioned in accordance with the rough size of the bore as determined by the gage 51 before the workpiece was loaded into the machine. When the cam 27 strikes the microswitch 33 and closes it, the feed is immediately reduced to a much lower level. The wheel spindle deflection is zero during most of the rapid traverse in-feed because there is no contact between the wheel and the workpiece. However, the moment contact is made, the grinding pressure rises to a preselected value and the spindle deflection is substantial. The grinding pressure is, of course, determined by the feed rate; in the present case, the rough grind feed rate is selected to give the highest grinding pressure consistent with adequate wheel life and this feed rate and grinding pressure remain constant during the entire rough grind. The spindle deflection is constant during the rough grind. Eventually, the cam 27 reaches and closes the microswitch 36; this changes the feed rate from the high value dictated by the rough grind to a much lower value that will soon be used during the finish grind. During the rapid in-feed and the rough grind (points 0 to point B) the back-off piston 21 has been at the right end of the cylinder 19; the closing of the microswitch 36 energized the coil 68 and this draws the plunger 62 into its lower position, so that pressure fluid passes to the right side of the piston 21 and the left side is connected to exhaust. The piston moves quickly to the left and then stays at the left end of the cylinder 19. This carries the secondary table 16 and the wheel 18 in the opposite direction and immediately reduces the spindle deflection and the grinding pressure to very small values. Now, the point B is selected so that the wheelhead at that time has carried the wheel through the workpiece almost to the desired finished size; because of the substantial spindle deflection, the wheelhead is, of course, far ahead of the position it would occupy if it were possible to grind without spindle deflection. The stroke of the piston 21 is selected to be such that the rearward movement of the wheelhead is sufficient to relieve all but a small value of spindle deflection and grinding pressure. Although the stroke appears to be appreciable in Figure 1, it will be appreciated, of course, that the amount of necessary retraction or back-off of the wheelhead is very small. Almost immediately, the cam 27 strikes and closes the microswitch 37 at the point C. This not only energizes the coil 69 to maintain the piston 21 at the left end of its cylinder, but it also energizes the coil 48 and opens the valve 47. The gaging pressure from the gage 51 acting on the next workpiece 53 to be ground is felt in the cylinder 43 and an adjustment of the microswitch 33 is made, if such be necessary. The finish grind at a low feed rate, small grinding pressure and small spindle deflection continues until the cam 27 strikes the microswitch 38 at the point D; this brings about the retraction of the wheel and the termination of the grinding action and the actuation of the loading mechanism. The coil 48 is energized only as long as the microswitch 37 is maintained closed by the cam 27; in the preferred embodiment, the length of the cam is such that the actuating finger of the microswitch 37 slides from the rearward end of the cam just as the actuating finger of the microswitch 38 slides up the forward end of the cam. The opening of the microswitch 37 also de-energizes the coil 69 and permits the plunger 62 of the valve 61 to return to its first position; the piston 21 moves to the right end of its cylinder carrying the wheelhead with it. It should be noted that the distance between the microswitches 37 and 38 is less than the length of the cam 27, so that the microswitch 37 is closed before the microswitch 36 opens; this assures that the plunger 62 of the valve 61 is in its second position from the point B to the point D and the wheel is in the back-off position.

The advantages of the apparatus of the invention will be understood best from a study of Figure 4. The line from point 0 to point A, representing the feed path of the wheelhead, has a steep slope indicating the rapid rate of in-feed. The line from point 0 to point A' represents the path of the wheel during this same period. Both of these paths are for a workpiece whose rough bore is of the correct diameter, so that the variation in rough size ($\Delta$ rough size) is zero. The wheel obviously does not follow the wheelhead because it immediately strikes the workpiece surface and begins to deflect and build up a grinding pressure; the vertical distance between the paths represents the deflection or grinding force F at any time. The line from point A to point B represents the steady and constant rough grinding feed rate and the line A'—B' represents the path of the wheel during this period. The wheel has reached the condition of greatest grinding pressure (and spindle deflection) at point A', and does not change it during the rough grind. The back-off of the wheel head, indicated by the line B—C does not cause a change in wheel position, as indicated by the fact that the points B' and C' are at the same location. The initiation of the finish grind produces a movement of the wheelhead along the line C—D and of the wheel along the line C'—D', these lines being parallel, indicating a constant, small grinding pressure F during this period of finish grind. The wheel is separated from the workpiece at the point D' when the desired size is reached. Now, when the gage 51 indicates a workpiece that has a bore which is large (less metal to remove) by an amount "$\Delta$ rough size," the point $A^2$ is adjusted to occur a longer period of time after the point 0 than the point A (resulting in further advanced position of cross-slide) so that, even though the slope of the line 0—$A^2$ is the same as that of the line 0—A (indicating the same in-feed rate), the point $A^3$ is reached at a much more advanced cross-slide position (slightly later in time) and the rough grind begins later. As indicated by the line 0—$A^3$, which is the path of the wheel when the oversized workpiece is being ground, the selected spindle deflection and grinding force is reached at a more advanced position of the cross-slide in the case of this workpiece with an oversized bore. Although the feed rate during rough grind is the same as in the case of the first workpiece, the rough grind begins slightly later by a proper amount, so that, when the wheelhead reaches the point $B^2$, which is at the same cross-slide position as the point B, it does so in a time somewhat less than the time in which point B was reached. Further-more, the wheel at that position of the wheelhead has reached the point $B^3$. During the back-off of the wheelhead to $C^2$, the wheel, of course, remains at $C^3$. Then, the wheelhead feeds at the finish grind rate until the "finished size" position of the cross-slide is reached at $D^3$; the cycle time is shortened, therefore, with an oversize bore and is lengthened (by the reverse of the above-described process) with an undersized bore.

It is obvious that minor changes may be made in the form and construction of the invention without departing from the material spirit thereof. It is not, however, desired to confine the invention to the exact form herein shown and described, but is desired to include all such as properly come within the scope claimed.

The invention having been thus described, what is claimed as new and desired to secured by Letters Patent is:

1. A grinding machine of the feed-rate type for finishing a workpiece, comprising a grinding wheel, a spindle on which the wheel is mounted, a wheelhead in which the spindle is mounted, means for feeding the wheelhead and workpiece relative to each other, means for gaging the surface of the workpiece, means bringing about a feeding of the grinding wheel toward the surface of the workpiece at a relatively rapid rate, means for terminating the rapid feeding at a point determined by the said gaging means, means for feeding the wheel against the surface at a rate giving a very large grinding force, means for terminating the feed at a point when the wheel is close to the desired finished size of the surface, reversing the feed to relieve the spindle deflection, and then continuing feed in the original direction at a substantially reduced degree of grinding force to bring the surface to the desired finished size.

2. An internal grinding machine for finishing a bore having a grinding wheel, wheel spindle, and feed mechanism, comprising means for gaging the bore, means for feeding the grinding wheel toward the surface of the bore at a relatively rapid rate, means for terminating the rapid feeding at a point predetermined by the said gaging of the bore, means for feeding the wheel against the surface of the bore at a rate giving approximately the maximum permissible grinding force, means for terminating the feed at a point when the wheel is close to the desired finished size of the bore, means for reversing the feed to relieve the spindle deflection, and means for continuing feed in the original direction at a substantially reduced degree of grinding force to bring the bore to the finished size.

3. A grinding machine having a grinding wheel for finishing a workpiece, comprising a gage for measuring the workpiece prior to the grinding operation, means bringing about a rapid in-feed of the wheel toward the workpiece, the said gage determining the length of the period during which the said in-feed takes place, means producing a rough grind with a very large grinding pressure, means bringing about a reversal of wheel feed to reduce the grinding pressure to a small value, and means bringing about a finish grind at the said small value of grinding pressure until the desired finished size is reached.

4. A grinding machine having a feeding mechanism, comprising a gage for determining the sizes of successive workpieces, means setting the feed mechanism to bring about a rapid in-feed, means set by the gage for actuating the feed mechanism to terminate the rapid in-feed at a point dependent on the size of each workpiece, the last-named means also setting the feed mechanism in a rough grind, means operative at a fixed feed point to relieve wheel spindle deflection, means operative at another fixed feed point to cause the feed mechanism to proceed at a finish grind rate, and means operative at a still further fixed feed point to terminate the grinding operation.

5. A grinding machine having a grinding wheel for finishing a workpiece, comprising means for gaging each workpiece before the grinding cycle begins, means for bringing about a rapid in-feed between the wheel and workpiece, means terminating the rapid in-feed after a period commensurate with the variation of the size of the workpiece from a standard, means producing a rough grind at a constant high rate, a reversal of wheel feed, and a finish grind at a constant low rate.

6. A grinding machine having a grinding wheel, comprising a gage for measuring a workpiece before the grinding operation, a feed mechanism capable of selectively feeding the wheel into the workpiece successively at a rapid in-feed rate, a rough grinding rate, and a finish grinding rate, means for producing a reversal of feed operation to reduce wheel spindle deflection to a low value between the rough grinding rate condition of the feed mechanism and the finish grind rate condition, and control means terminating the rapid in-feed rate condition of the feed mechanism after a period determined by the measurement of the workpiece by the gage.

7. A grinding machine having a grinding wheel, comprising a pneumatic gage for measuring a workpiece before the grinding operation, a feed mechanism capable of selectively feeding the wheel into the workpiece successively at a rapid in-feed rate, a rough grinding rate, and a finish grinding rate, means for producing a reversal of feed operation to reduce the wheel spindle deflection to a low value between the rough grinding rate condition of the feed mechanism and the finish grind rate condition, a mechanism for terminating the rapid in-feed rate condition of the feed mechanism after a period determined by the measurement of the workpiece by the gage, the said mechanism including a piston whose position is determined by the back-pressure from the gage.

8. A grinding machine having a grinding wheel, comprising a gage for measuring a workpiece before the grinding operation, a feed mechanism capable of selectively feeding the wheel into the workpiece successively at a rapid in-feed rate, a rough grinding rate, and a finish grinding rate, means for producing a reversal of feed operation to reduce the wheel spindle deflection to a low value between the rough grinding rate condition of the feed mechanism and the finish grind rate condition, a switch located in position to be actuated by a part of the feed mechanism and connected to terminate the rapid in-feed rate condition of the feed mechanism after a period determined by the measurement of the workpiece by the gage, and control means moving the switch to cause its actuation sooner or later depending on the size of the workpiece as compared with a preselected standard.

9. A grinding machine having a grinding wheel, comprising a pneumatic gage for measuring a workpiece before the grinding operation, a feed mechanism capable of selectively feeding the wheel into the workpiece successively at a rapid in-feed rate, a rough grinding rate, and a finish grinding rate, means for producing a reversal of feed operation to reduce the wheel spindle deflection to a low value between the rough grinding rate condition of the feed mechanism and the finish grind rate condition, a switch located in position to be actuated by a part of the feed mechanism and connected to terminate the rapid in-feed rate condition of the feed mechanism after a period determined by the measurement of the workpiece by the gage, and a mechanism for moving the switch to cause its actuation after a period depending on the size of the workpiece as compared with a preselected standard, the said mechanism including a piston whose position is determined by the back-pressure from the gage.

10. A grinding machine as recited in claim 9, wherein is provided a means for causing the back-pressure from the gage to be felt by the piston only during the finish grinding of a preceding workpiece and to be trapped within the cylinder associated with the piston until the in-feed on the following workpiece is completed.

References Cited in the file of this patent
UNITED STATES PATENTS

| | | |
|---|---|---|
| 2,639,563 | Swainey | May 26, 1953 |
| 2,794,304 | Frankiewicz et al. | June 4, 1957 |
| 2,802,312 | Gosney et al. | Aug. 13, 1957 |
| 2,841,933 | Burt | July 8, 1958 |